United States Patent
Post

[11] Patent Number: 5,887,831
[45] Date of Patent: Mar. 30, 1999

[54] ROOF CABLE SUPPORT SYSTEM

[76] Inventor: Robert E. Post, 149 Lindbergh Pkwy., Waldwick, N.J. 07463

[21] Appl. No.: 905,867

[22] Filed: Aug. 4, 1997

[51] Int. Cl.$^6$ ...................................................... F16L 3/00
[52] U.S. Cl. ............................ 248/49; 248/68.1; 248/237
[58] Field of Search ................................ 248/49, 56, 57, 248/65, 74.1, 237, 68.1

[56] References Cited

U.S. PATENT DOCUMENTS

| | | | |
|---|---|---|---|
| 5,271,585 | 12/1993 | Zetena, Jr. | 248/49 |
| 5,548,932 | 8/1996 | Mead | 248/49 |

*Primary Examiner*—Ramon O. Ramirez
*Assistant Examiner*—Willie Berry, Jr.
*Attorney, Agent, or Firm*—Richard A. Joel, Esq.

[57] ABSTRACT

A cable support system for use on roofs comprises a cable support bracket with a raised center portion, having a plurality of spaced apertures located thereon, walls extending downwardly from said raised portion to form a channel therebetween and flange portions extending outwardly from the base of said walls having apertures at the end of each flange portion. The system further includes a roof pad to which the bracket is affixed with mounting means extending through the flange apertures. The bracket is mounted perpendicularly to the cables which are secured in position by snap in hanger brackets which extend through the apertures in the cable support bracket. A second bracket extension may be mounted above the bracket increasing the cable capacity. A substantially U-shaped cover is mounted over the cable and secured to adjacent brackets. The cover includes an upper surface and downwardly extending side portions. The cover is designed in approximately four foot lengths which extend between adjacent brackets to protect the cable in the event it is stepped on or otherwise contacted on the roof. With the bracket system, it is possible to rapidly and conveniently install cables on a roof with cable running from an antenna mounted on the side of the building to the ultimate users within the building. The brackets are extremely strong, light-weight and rust-proof.

8 Claims, 3 Drawing Sheets

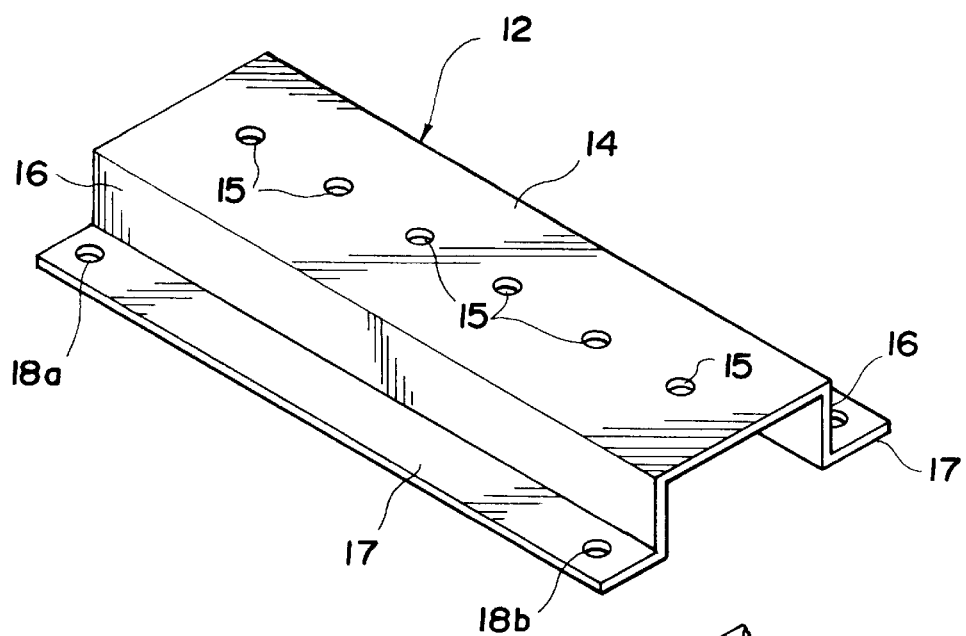
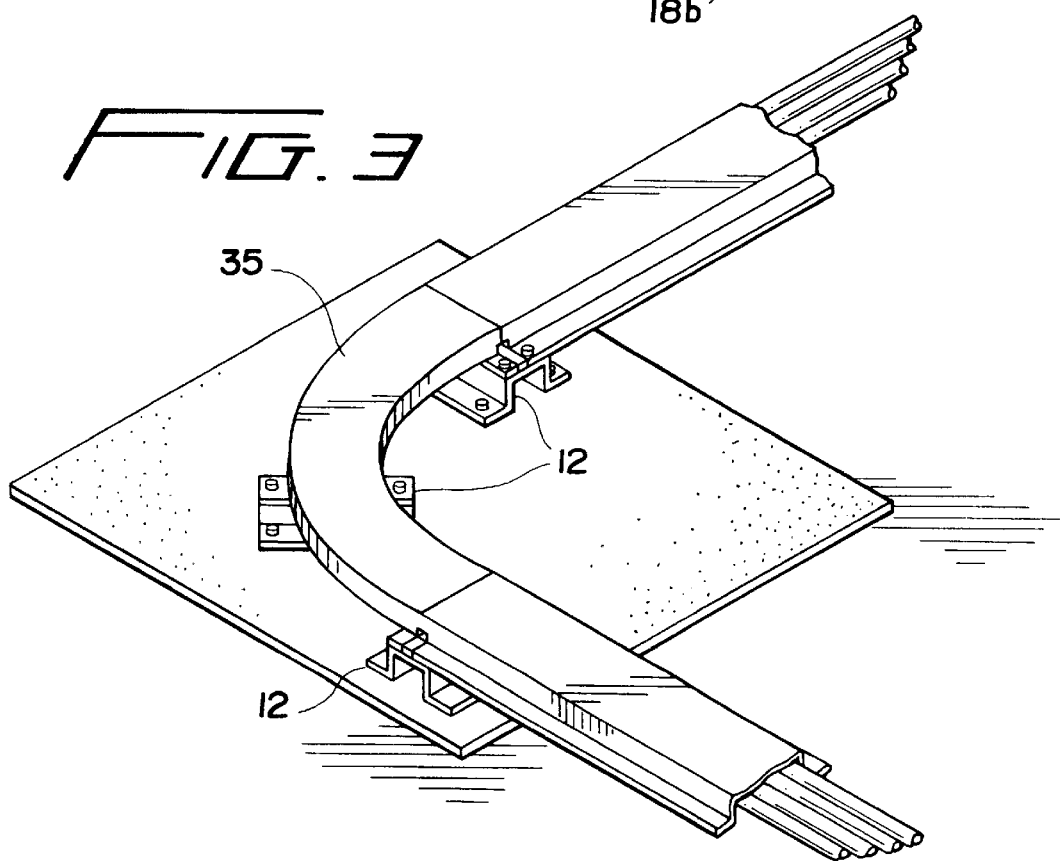

ROOF CABLE SUPPORT SYSTEM

BACKGROUND OF THE INVENTION

In the installation of cable antennas particularly on city roof tops, it is common practice to run cable along the roof to the antenna. Unfortunately, the cables are subject to damage by people stepping on the cables, tripping on the cables or, deliberately damaging the cables. There is a further problem with more compact designs and in limited access buildings where large trays cannot be accommodated. No adequate solution had been found for these problems until applicants' proposed bracket system was developed. Applicants' invention is the only roof top system designed specifically for wireless communication.

Applicant's invention permits stringing the cable directly along the roof to the antenna whereas other methods involve circuitous routes over roof tops or feeding the cable through conduits which would make it inexcessible for repairs or modifications without a major effort. In applicant's arrangement, the cable is readily accessible and yet is protected from damage. The cable brackets proposed herein have met ready acceptance which in unusual in a climate where change is difficult to implement and there is generally landlord/tenant resistance.

The bracket system also shields the cable from the effects of weather and corrosion. The four foot lengths permit the use of elevators in bringing parts to the roof whereas other systems rely upon elongated protective ducts which must be hoisted to the roof. The system is also readily expandable from the common six runs of cable to twelve runs of cable.

SUMMARY OF THE INVENTION

This invention relates to cable brackets and in particular to a method and apparatus for protecting and supporting cable on rooftops utilizing a new and unique bracket system.

The bracket itself involves an elongated member having a raised surface with a plurality of spaced apertures extending therethrough, downwardly extending walls and outwardly extending flanges joined to the base of the walls. The flanges are secured to an asphalt roof pad by mounting means which extend through apertures in the flanges. A plurality of cables are joined to the bracket by clips which extend into the apertures in the raised surface. An extension bracket may be mounted over the bracket to accommodate additional cable runs. The cable is strung perpendicularly between adjacent brackets and a cover is mounted thereover and secured to each bracket.

The cover is peaked along a central axis for purposes of drainage. The covers are conventionally four feet long and may be joined to adjacent covers on adjacent brackets by the use of clips. The bracket is preferably made of galvanized steel for purposes of strength and durability. Variations in the bracket geometry include the use of T-shaped brackets and U-shaped brackets.

Accordingly, it is an object of this invention to provide a new and improved bracket for mounting rooftop and wall cables.

Another object of this invention is to provide a new and improved rooftop bracket for cable wherein the bracket is readily mounted to an asphalt pad positioned on the roof.

A still further object of this invention is to provide a new and improved bracket system for rooftop cable maintained in position by brackets including a cover which mounts over cable brackets and includes a peaked axial section for purposes of drainage.

A more specific object of this invention is to provide a new and improved rooftop cable bracket system wherein the cable bracket includes a plurality of apertures for ready connection with cables extending perpendicular thereto and an extension bracket mounted thereover to accommodate additional cable runs and a peaked cover mounted thereover and extending between adjacent brackets to protect and support cables.

BRIEF DESCRIPTION OF THE DRAWINGS

The above and other objects and advantages of this invention may be more clearly seen when viewed in conjunction with the accompanying drawings wherein:

FIG. 2 is a perspective view of a cable bracket;

FIG. 3 is a view of a curved cover for a cable bracket;

DETAILED DESCRIPTION OF THE INVENTION

Figure 1:
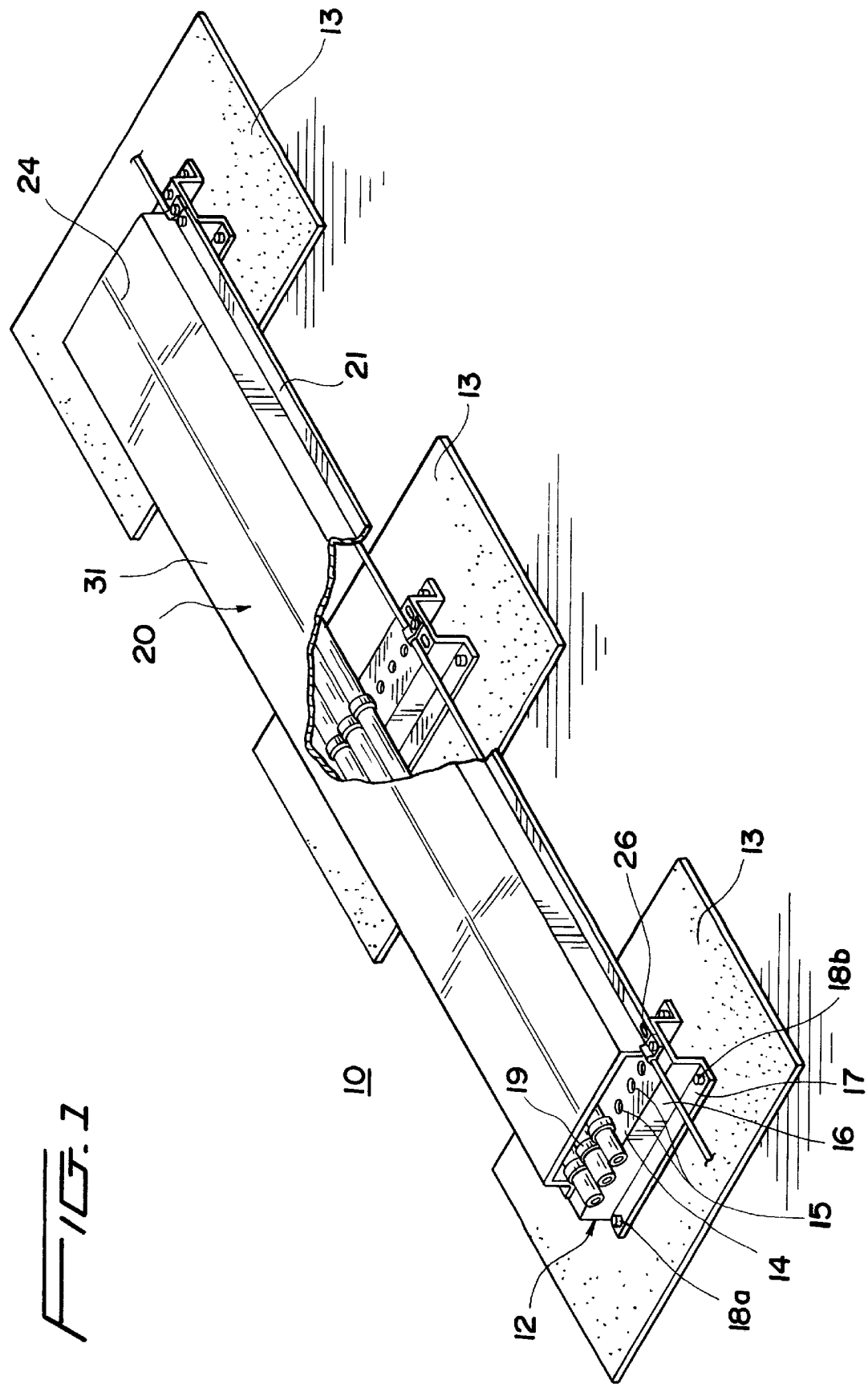
FIG. 1 is a perspective view of the cable bracket system as appearing in a tray section on a roof with portions cut-away

Referring now to the drawings and particularly FIG. 1, this invention relates to a bracket system 10 for rooftop cables 11a, 11b and 11c. While 3 cables are shown, it is to be understood that additional cables could be mounted on the bracket 12 consistent with the number of apertures 15 provided. Normally up to six (6) cables are mounted on the bracket 12. The bracket system 10 includes a bracket 12 which is mounted to an asphalt or rubber roof pad 13. The pads 13 are spaced for drainage purposes on the roof and comprise asphalt material with dimensions of approximately 3'×2'×½". The pads 13 also permit the mounting of brackets 12 on uneven roofs.

The bracket 12 includes an upper surface 14 having a plurality of apertures 15 extending longitudinally along the upper surface 14 at spaced intervals and downwardly extending opposing walls 16 at the outer end of the surface 14. Commonly a bracket 12 would include six apertures 15. The bottom of the walls 16 include an outwardly extending flange 17 which engages the pad 13. The bracket 12 is secured to the roof pad 13 by bolts which extend through the apertures 18a, 18b.

The cables 11a–11c are mounted to each bracket 12 with bracket clips 19 which mount in the holes 15. The cables 11a–11c extend between adjacent brackets 12 located at approximately 4' intervals.

Figure 4:
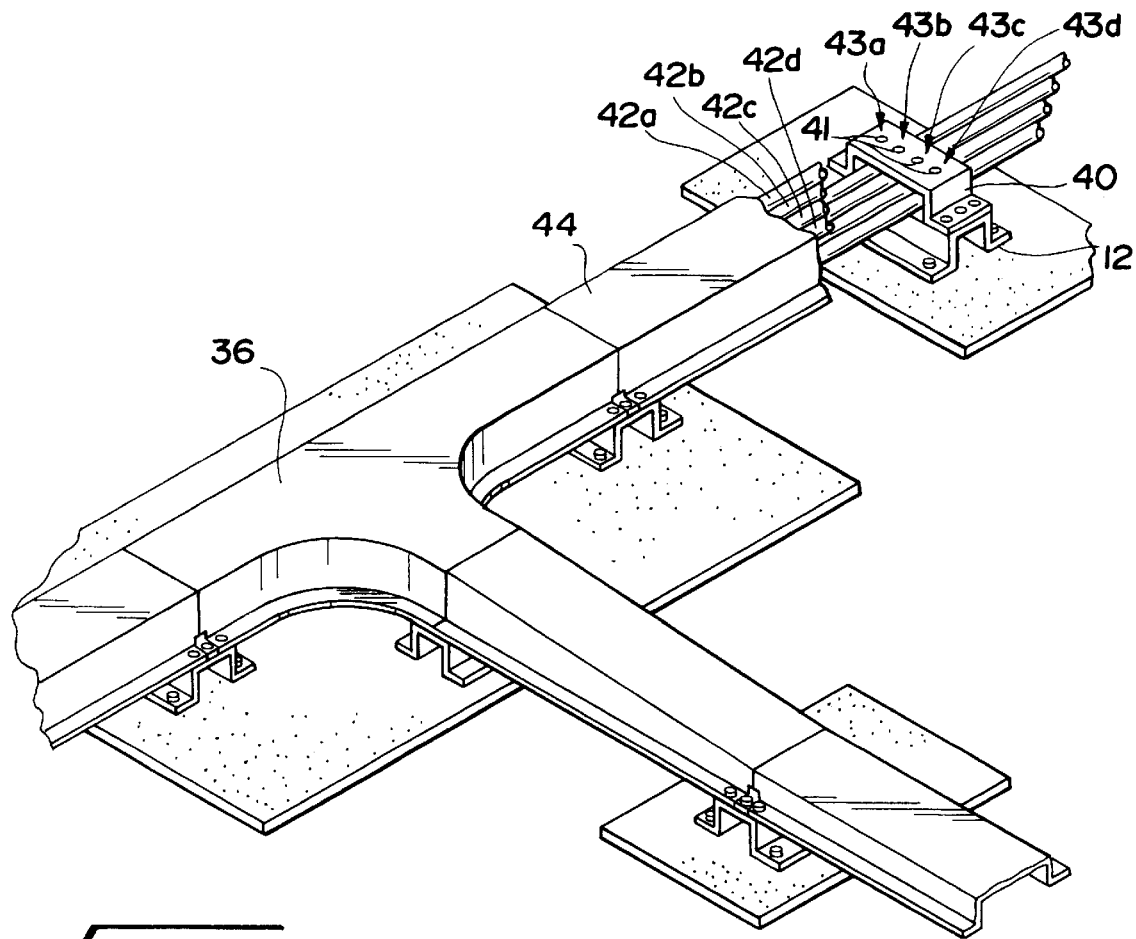
FIG. 4 is a view of a tee-cover for the brackets.
Figure 5:
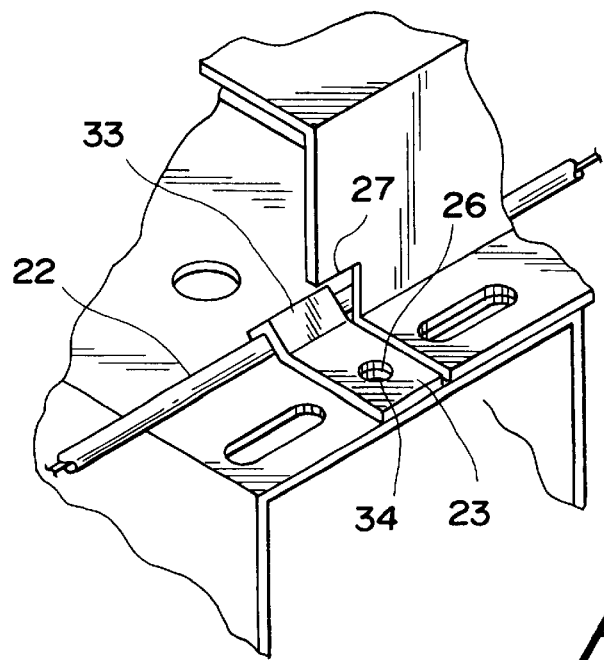
FIG. 5 is an exploded view of a portion of FIG. 1 showing the mounting of a ground clip.

As shown in FIG. 4, an extension bracket 40 may be mounted over the bracket 12 to accommodate additional cable runs. The bracket 40 includes a plurality of transverse apertures 41 into which cables 42a, 42b 42c, etc. are mounted to bracket 12 at 43a, 43b, 43c and 43d. A deeper cover 44 is mounted over the two brackets 12 and 40.

A cover 20 is mounted over the cables 11a–c and secured to the brackets 12. The cover 20 comprises a substantially U-shaped inverted channel member which includes outwardly extending flanges 21 on the walls 32 which are coupled to the brackets 12 through apertures 26. The cover 20 may include a longitudinal peak 24 on the upper surface 31 for drainage purposes. The peak 24 is at a slight angle to permit standing or walking thereon without tripping.

A ground wire 22 which extends parallel to the cable 14 is also connected to the bracket 12 by ground clips 23. The ground clips 23 extend through a cutaway opening 27 in the walls 32 where a curved end portion 33 engages the cable 22. The clips 23 are affixed to the bracket 12 by bolts which extend through holes 34 and 26 which are lined up for mounted purposes. Where an extension 40 bracket is used, the single ground wire 22 will suffice.

FIG. 3 is a view of a curved cover 35 which mounts over the brackets 12 while FIG. 4 is a view of a T-shaped cover 36 which mounts over the brackets to provide directionality to the cables.

While the invention has been explained by a detailed description of certain specific embodiments, it is understood that various modifications and substitutions can be made in any of them within the scope of the appended claims which are intended also to include equivalents of such embodiments.

What is claimed, is:

1. A cable support system for use on roofs wherein a plurality of cables are run along the roof to an antenna comprising:
   a plurality of elongated support brackets each comprising a raised center portion having a plurality of spaced apertures extending therethrough, side wails having one end extending downwardly from said center portion and flange portions extending outwardly from the other end of said walls and having apertures extending therethrough;
   a plurality of roof pads each having a bracket mounted thereto;
   means mounting each cable to the raised portion of the bracket;
   a ground wire mounted to each bracket; and,
   a cover of a predetermined limited length having a top portion including a raised center extending axially there-along, downwardly extending sides, each terminating in an outwardly extending flange, said flange being mounted to the raised portion of the bracket to protect the cables.

2. A cable support system for use on roofs wherein a plurality of cables are run along the roof to an antenna in accordance with claim 1 further including:
   a plurality of snap-in hangers mounting the cables to the apertures in the raised portion of the bracket; and
   a plurality ground of ground clips each mounting the ground wire to a particular bracket.

3. A cable support system for use on roofs wherein a plurality of cables are run along the roof to an antenna in accordance with claim 1 wherein:
   the cover has a curved configuration.

4. A cable support system for use on roofs wherein a plurality of cables are run along the roof to an antenna in accordance with claim 1 wherein:
   the cover has a T-shaped configuration.

5. A cable support system for use on roofs wherein a plurality of cables are run along the roof to an antenna in accordance with claim 1 wherein:
   the cover has a Y-shaped configuration.

6. A cable support system for use on roofs wherein a plurality of cables are run along the roof to an antenna in accordance with claim 1 further including:
   an extension bracket mounted over each support bracket, said extension bracket having a raised center portion, side portions extending downwardly at one end from the raised portion and flanges extending outwardly from the other end of the side portions for mounting to the support bracket and wherein the cover sides extend downwardly for mounting to the pad.

7. A cable support system for use on roofs wherein a plurality of cables are run along the roof to an antenna in accordance with claim 1 wherein:
   the covers are approximately four feet in length.

8. A cable support system for use on roofs wherein a plurality of cables are run along the roof to an antenna in accordance with claim 1 wherein:
   the pads are of an asphalt material.

* * * * *